(12) United States Patent
Goermer et al.

(10) Patent No.: US 9,344,580 B2
(45) Date of Patent: May 17, 2016

(54) CHARGING FOR SHORT MESSAGE DELIVERY

(75) Inventors: Gerald Goermer, Wandlitz (DE); Robert Engelbert Hubert Kamphuis, Ojakkala (FI); Jens Schendel, Berlin (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/001,528

(22) PCT Filed: Jun. 26, 2008

(86) PCT No.: PCT/EP2008/058197
§ 371 (c)(1),
(2), (4) Date: Dec. 27, 2010

(87) PCT Pub. No.: WO2009/155983
PCT Pub. Date: Dec. 30, 2009

(65) Prior Publication Data
US 2011/0098066 A1   Apr. 28, 2011

(51) Int. Cl.
*H04W 4/00* (2009.01)
*H04M 15/06* (2006.01)
(Continued)

(52) U.S. Cl.
CPC .............. *H04M 15/06* (2013.01); *H04M 15/55* (2013.01); *H04M 15/63* (2013.01);
(Continued)

(58) Field of Classification Search
CPC . H04M 15/06; H04M 15/8292; H04M 15/63; H04M 15/8077; H04M 15/8083; H04M 15/8221; H04M 15/55; H04M 2215/28; H04M 2215/0184; H04M 2215/7492; H04M 2215/44; H04M 2215/2073; H04M 2215/7826; H04W 4/14
USPC .......... 455/466, 414.1, 414.4, 405–408, 503, 455/404.1, 404.2, 418–420, 412.1–415; 370/270, 312, 389, 390, 432, 349, 471
See application file for complete search history.

(56) References Cited

U.S. PATENT DOCUMENTS 7,580,363 B2 * 8/2009 Sorvari ................. H04M 1/271
                                                    370/252
8,289,885 B2   10/2012 Cai et al.
(Continued)

FOREIGN PATENT DOCUMENTS

CN         1452416 A    10/2003
CN       101183957 A     5/2008
(Continued)

OTHER PUBLICATIONS

Anonymous: "3GPP TS 32.274 V8.2.0 (Jun. 2008); 3rd Generation Partnership Project; Technical Specification Group Service and Systems Aspects; Telecommunication management; Charging management; Short Message Service (SMS) charging (Release 8)" [Online] Jun. 17, 2008, 3GPP, Internet Publication, XP002523723 Retrieved from the Internet: URL:http://www.3gpp.org/ftp/Specs/html-info/32274.htm> [retrieved on Apr. 15, 2009] the whole document.
(Continued)

*Primary Examiner* — Ronald Eisner
(74) *Attorney, Agent, or Firm* — Laurence A. Greenberg; Werner H. Stemer; Ralph E. Locher

(57) ABSTRACT

A short message service (SMS) node detects that at least one request to deliver a plurality of short messages (SM) originates from a single user. Information (MSISDN, ISMI) related to recipients of the plurality of short messages is combined in a signaling message, and the signaling message is transmitted to a charging function (OFCS, OCS).

17 Claims, 7 Drawing Sheets

(51) Int. Cl.
*H04M 15/00* (2006.01)
*H04W 4/14* (2009.01)

(52) U.S. Cl.
CPC ..... *H04M 15/8077* (2013.01); *H04M 15/8083* (2013.01); *H04M 15/8221* (2013.01); *H04M 15/8292* (2013.01); H04M 2215/0184 (2013.01); H04M 2215/2073 (2013.01); H04M 2215/28 (2013.01); H04M 2215/44 (2013.01); H04M 2215/7492 (2013.01); H04M 2215/7826 (2013.01); H04W 4/14 (2013.01)

(56) References Cited

U.S. PATENT DOCUMENTS

| | | | |
|---|---|---|---|
| 2003/0193951 A1* | 10/2003 | Fenton et al. | 370/392 |
| 2006/0128403 A1* | 6/2006 | Baldassini et al. | 455/466 |
| 2007/0105536 A1* | 5/2007 | Tingo, Jr. | 455/414.1 |
| 2007/0281717 A1* | 12/2007 | Bharadwaj | 455/466 |
| 2009/0253405 A1* | 10/2009 | Yang | 455/406 |

FOREIGN PATENT DOCUMENTS

| | | |
|---|---|---|
| EP | 1755353 A1 | 2/2007 |
| JP | 2002325098 A | 11/2002 |
| KR | 20050104146 A | 11/2005 |
| WO | 0149050 A2 | 7/2001 |
| WO | WO 03021983 A1 * | 3/2003 |
| WO | 2008054647 A1 | 5/2008 |

OTHER PUBLICATIONS

Anonymous: "only table of contents from 3GPP TS 32.299 V8.3.0 (Jun. 2008); 3rd Generation Partnership Project; Technical Specification Group Service and System Aspects; Telecommunication management; Charging management; Diameter charging applications (Release 8)" [Online] Jun. 17, 2008, 3GPP, Internet Publication, XP002523724, Retrieved from the Internet: URL:http://www.3gpp.org/ftp/Specs/html-info/32299.htm> [retrieved on Apr. 15, 2009] table of contents chapter 7.2.

Vodafone: "Introduce Diameter details for SMS charging" Dec. 5, 2007, 3GPP Draft; 32299_CR0205R1_(Rel-8)_S5-072017, 3rd Generation Partnership Project (3GPP), Mobile Competence Centre; 650, Route des Lucioles, F-06921 Sophia-Antipolis Cedex; France, XP050210051.

* cited by examiner

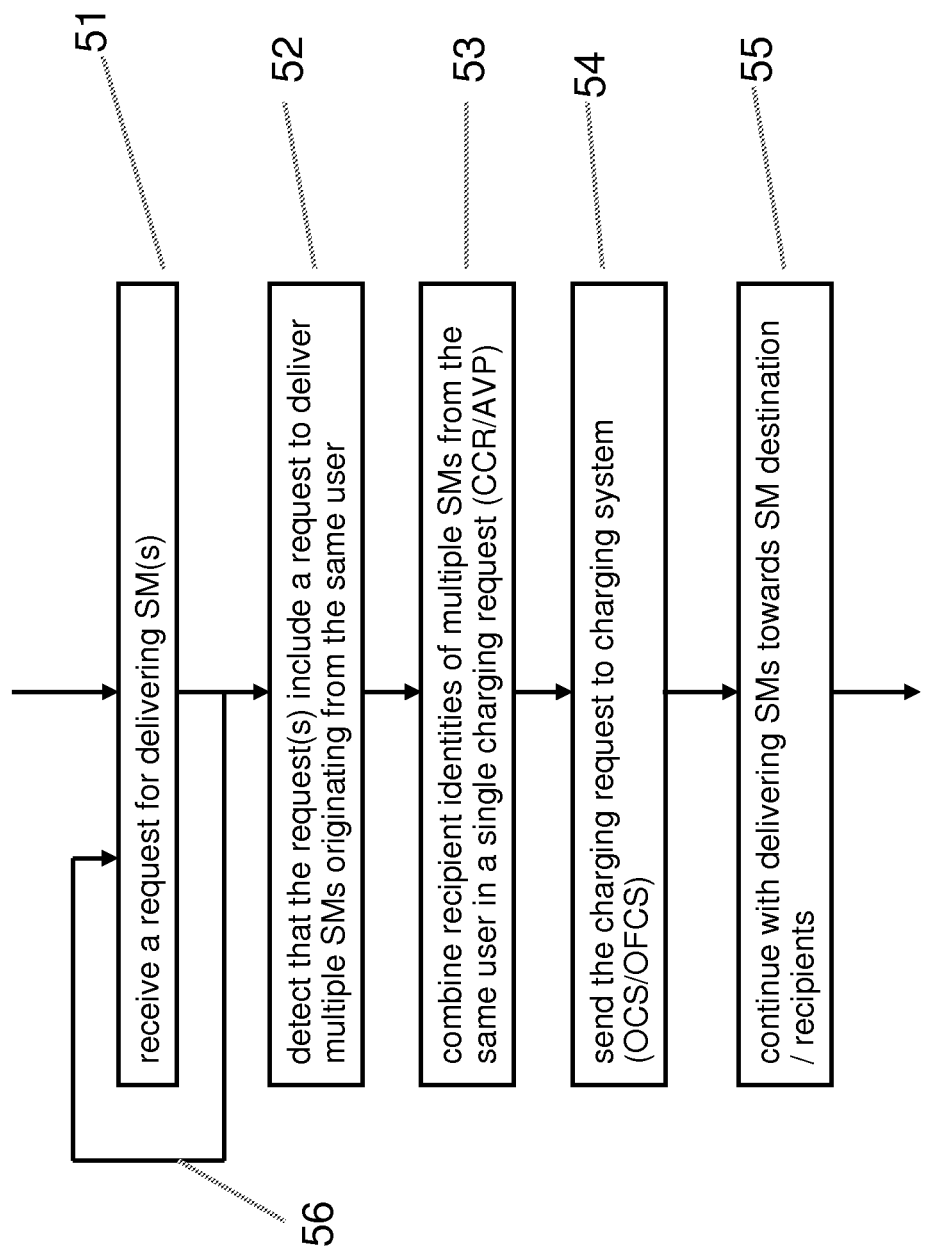

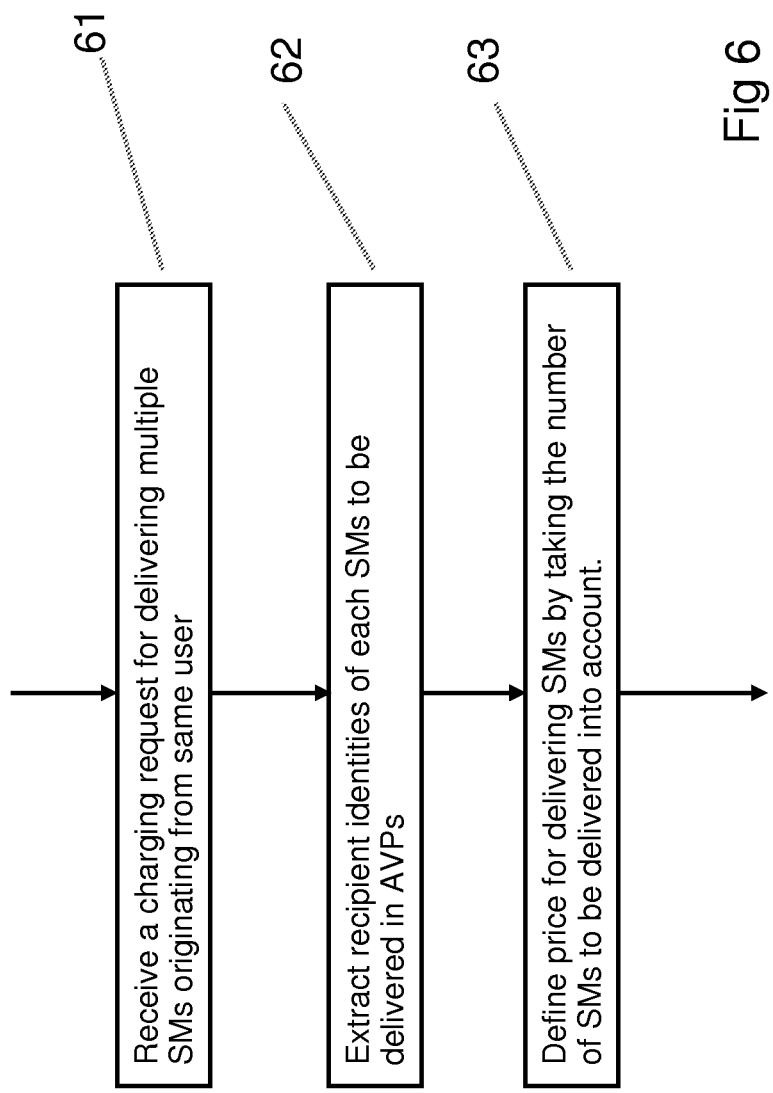

CHARGING FOR SHORT MESSAGE DELIVERY

TECHNICAL FIELD OF THE INVENTION

The invention relates to a short message service entity, charging entity, a method and computer program products for charging multiple short messages from a single user.

BACKGROUND OF THE INVENTION

The Short Message Service (SMS) is one of the operator's key services frequently used by the customer.

Traditionally SMS is based on signalling system No. 7 (SS7) architecture as defined by 3rd Generation Partnership Project. The architecture currently standardized by 3GPP allows short message (SM) interworking with internet protocol (IP) based networks, for example using Session Initiation Protocol (SIP) signalling. SIP is an application-layer control protocol for creating, modifying, and terminating dialogs with one or more participants. These dialogs may include Internet multimedia conferences, Internet telephone calls, and multimedia distribution. Members in a dialog can communicate via multicast or via a mesh of unicast relations, or a combination of these. SIP is used as signalling protocol in an internet protocol (IP) multimedia subsystem (IMS).

The 3GPP also standardizes a new charging framework for both IP and legacy SM signalling that includes the definition of a Diameter (i.e. an IP protocol) based online charging interface (Ro) between the Online Charging Server (OCS) and an SMS Router or IP-SM-Gateway. The approach for offline charging based on Rf interface is currently not standardized. The SMS Router can be for example a SM Service Centre (SMSC) or a separate node as architectural options.

Currently a SM can only be sent to one destination. If the sender wants to send the same message to more than one destination (e.g. recipients) then the same SM must be resent. Such retransmission can be launched by the subscriber itself (re-sending of stored sent message) or by a terminal application. In the latter case the sender assigns multiple destinations to the SM he wants to broadcast whereas the terminal application accomplishes it by actually emitting one SM per recipient. This leads to multiple SMS traffic in terms of SMS data, signalling and also for charging.

The operator must consider such intentionally broadcast messages as single events. Hence the core network as well as the charging infrastructure, i.e. the OCS for prepaid subscribers, can face performance issues.

SUMMARY OF THE INVENTION

In this application the term "unit" and the term "means" are used as equivalent terms. For example "transmitting unit (303) and "transmitting means (303)" have the same meaning.

The present invention overcomes the above problem by providing a short message service entity and a method comprising detecting at least one request to deliver a plurality of short messages originating from a single user, combining information related to recipients of the plurality of short messages in a signaling message, and transmitting the signaling message to a charging function. Transmitting may happen by a transmitting means transmitting the signaling message over Ro and/or Rf interface of $3^{rd}$ generation partnership project (3GPP). The information related to the recipients can comprise identities of the recipients of the plurality of short messages, and combining can comprises including the identities of the recipients of the plurality of short messages in attribute-value pairs (AVP). The including the identities of the recipients can comprise including the identity of the recipient of each short message in a separate attribute-value pair (AVP) so as to have the attribute-value pair (AVP) embedded in the signaling message once per a short message to be delivered to recipients. The attribute-value pair (AVP) can be [Recipient-Address] attribute-value pair (AVP). The SMS entity and method can further comprise embedding the attribute-value pairs (AVP) including the identities of the recipients into at least one further attribute-value pair (AVP) for indicating a recipient, for example by:

embedding each attribute-value pair (AVP) including the identity of the recipient in a separate further attribute-value pair (AVP) for indicating the recipient, or embedding all the attribute-value pairs (AVP) including the identities of the recipients into the single further attribute-value pair (AVP) for indicating the recipient, or mixture of both previous options.

The embedding can comprise embedding the at least one further attribute-value pair (AVP) for indicating the recipient into a [SMS Information] attribute-value pair (AVP).

The SMS entity and method can further comprise receiving the at least one request to deliver the plurality of short messages (SM) and or relaying the plurality of short messages further in a communication system. The relaying can comprise:

relaying the at least one request to deliver according to the same protocol than the at least one request to deliver is received by receiving means, or relaying the at least one request to deliver after converting the at least one request into another protocol for carrying the plurality of short messages.

The SMS entity and method can further comprise awaiting, after receiving a first request of the at least one request, a predetermined time to check whether a further request to deliver a short message originating from the single user is received, and if the further request is received, the combining can comprise combining the information related to recipients into the signaling message.

The invention further provides a charging entity and a method comprising receiving a charging request relating to delivering plurality of short messages originating from a single user. The charging request can be a request according to Diameter protocol. The charging entity and method can comprise extracting, in the received request, identities of recipients of each short message delivery, wherein each identity is embedded in a separate [Recipient-Address] attribute-value pair (AVP), for example by extracting the attribute-value pairs (AVP) including the identities of the recipients from at least one further attribute-value pair (AVP) for indicating a recipient, and further by extracting the at least one further attribute-value pair (AVP) for indicating the recipient from a [SMS Information] attribute-value pair (AVP).

The charging entity and method can comprise defining a price for delivering said plurality of short messages originating from the single user, wherein a price per short message or the total price for delivering all the short messages is defined taking the number of short messages into account.

In a further embodiment, a computer program product may comprise code means adapted to produce the steps of any of the embodiments of the above outlined methods when loaded into the memory of a computer.

In a further embodiment, a communication system may comprise a charging function and a short message service (SMS) entity of any of the above outlined embodiments.

The embodiments of the present invention can provide one or more of the following advantages:

Charging requests relating to multiple delivered SMs from the same user/sender can be transmitted to charging system more effective.

An SMS entity may act as a SM precounting entity. I.e. it may collect a predefined number (bucket) of SM charging requests per subscriber and initiate a "collected" charging request—with multiple destinations—to OCS when the bucket is filled up.

An application may have direct access to the SMSC (e.g. by using SMPP) and send multiple destinations within on (SMPP) request, while the SMSC can send the charging request with the multiple destinations.

For application generated SMs it is possible to access the SMSC from the SM generating node directly via an IP interface based industry standards, such as SMPP and UCP. This results in increased IP traffic for SM signalling and charging. Aspects of the invention therefore increase efficiency of service and reduce IP traffic. This will finally result in decreased Capital Expenditure (CAPEX) and Operating Expenditure (OPEX) for the network operator.

Saving of signaling and SM data storage resources on both peers, client (SMS node) and server (OCS).

Offer the operator the use of new rating properties in the OCS;

Overload prevention and error correction controlled by the OCS e.g. limitation of number of SM destinations during processing of SM by an application.

DESCRIPTION OF DRAWINGS

FIG. 5 presents an example process for a SMS node according to an embodiment of the invention.

FIG. 6 presents an example process for charging system according to an embodiment of the invention.

DETAILED DESCRIPTION OF THE INVENTION

Figure 1:
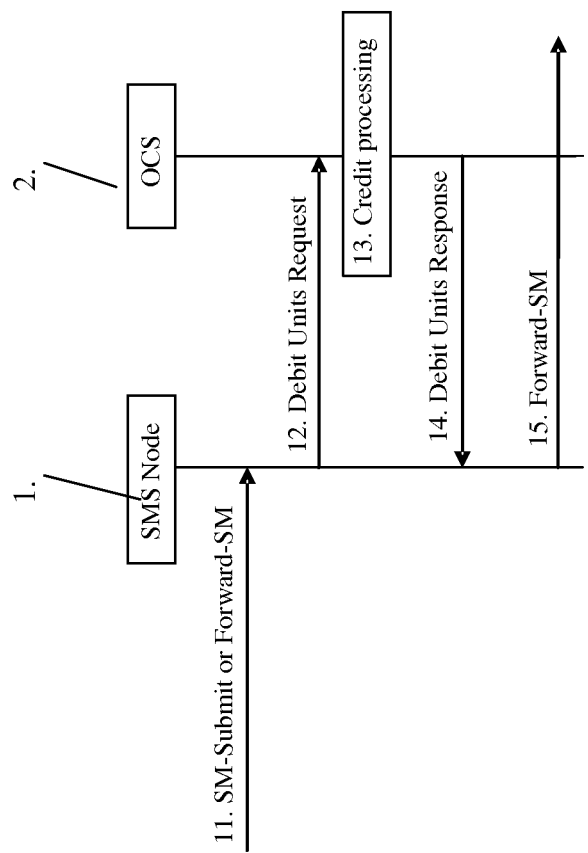
FIGS. 1, 1a and 2 illustrate short message charging scenarios relevant for this invention.

Short message peer-to-peer (SMPP) protocol is an industry designed protocol for transmitting SMs between short message entities, SM routers and messaging centers. A messaging entity can be for example a fixed network SMS client, wireless application protocol (WAP) proxy server, an e-mail gateway or a voice mail server.

Mobile application part (MAP) is part of the signalling system of a mobile network used for signalling between mobile network centers and registers. The MAP is used for location updates, call control of incoming calls to a mobile station, as well as for transmission of short messages.

Service Centre (SC) (also referred here as SMS node) is a function responsible for the relaying and store and forwarding of a short message between an SM entity (SME) and an MS (also referred here as user equipment [UE] or user). IP-Short-Message-Gateway (IP-SM-GW) is a function responsible for protocol interworking between the IP-based User Equipment (UE) and the SC.

SMSIP MESSAGE is a SIP immediate message which encapsulates a SM in its text body.

An IP-SM-GW provides the protocol interworking for delivery of the short message between the IP-based UE and the SMS-SC. The message can be routed to the SMS-SC for delivery to the SMS-based user or the message can be received from the SMS-SC of an SMS-based UE for delivery to an IP-based UE. Functions of the IP-SM-GW can be:

to determine the domain (circuit switched (CS), packet switched (PS) or the IMS) for delivery of a SM, to connect to the SMS-interworking (IW) Mobile Switching Centre (MSC) using established MAP protocols, appearing to the SMS-IW MSC as an MSC or Serving Gateway Switching Node (SGSN) using the E or Gd interfaces, to connect to a Home Subscriber Server (HSS) using established MAP protocols, to obtain the address of MSC/SGSN address(es) for SM termination in CS/PS;

to acquire and maintain knowledge of the association between the identities of the user, to check that it has a valid address in SMS for the sender as well as the recipient when receiving an IMS message for an SMS user. The IP-SM-GW shall obtain a valid address for both from the SIP headers of the IMS message (e.g. the sender would be identified in the asserted id in form of TEL URI);

for terminating procedures, to map the recipient's address from an MSISDN/IMSI to TEL URI format when receiving an SMS for an IP-based UE, and then it is the responsibility of the IMS core to perform any further mapping towards a SIP URI as required;

to act as an Application Server (AS) towards the IMS core;

to perform domain selection to choose the appropriate domain to deliver a message to a recipient and to obtain the MSC and/or SGSN addresses from the HSS.

Charging is a function within the telecommunications network and the associated charging elements whereby information related to a chargeable event is collected, formatted, transferred and evaluated in order to make it possible to determine usage for which the charged party may be billed (offline charging) or the subscribers account balance may be debited (online charging).

Offline charging is a charging mechanism where charging information does not affect, in real-time, the service rendered, whereas online charging is a mechanism where charging information can affect, in real-time, the service rendered and therefore a direct interaction of the charging mechanism with session/service control is required.

Diameter base protocol is authentication, authorization, and accounting (AAA) protocol, defined by Internet Engineering Task Force (IETF), used for network access services, such as dial-up and mobile IP. Diameter node is host process that implements the Diameter protocol and acts as a client, agent, or server. Diameter accounting can be used to implement charging data collection for offline charging as similar Rf interface approach as for IMS Offline Charging. The Diameter accounting application uses accounting messages, namely Accounting Request (ACR) and Accounting Answer (ACA) messages, to handle the online charging of a session. Diameter credit-control application (RCCA) is a Diameter protocol application that can be used to implement online credit control for a variety of end-user services. The services can include, for example, network access, SIP services, messaging services, and download services. The Diameter credit-control application uses credit-control messages, namely Credit Control Request (CCR) and Credit Control Answer (CCA) messages, to handle the online charging of a session. A Diameter client sends CCR messages to a Diameter server, and receives CCA messages as a response. For 3GPP online charging, the basic functionality as defined by the IETF Diameter Credit Control application is used. The basic structure follows a mechanism where the online client, for example a charging trigger function (CTF), requests resource allocation and reports credit control information to the Online Charging System (OCS). SMS online charging uses the Diameter Credit Control application and may use the Immediate Event Charging (IEC) principle or the Event Charging with Unit Reservation (ECUR). The chargeable events for subscriber charging are associated with SM transactions. For online charging, the SMS nodes utilise the co-called Ro interface and application towards the OCS as specified by the 3GPP. The Ro reference point is Diameter based and covers all online charging functionality required for SMS. SMS node can be, for example, an SMS router, IP-SM-GW or both.

FIG. 1 shows an example of Immediate Event Charging (IEC). Depending on which SMS mechanism (i.e. SMS or SMSIP) is in operation, in step 11 the SMS node 1 receives an incoming SM-Submit or a MAP-Forward-SM. In step 12 the SMS node 1 triggers a Debit Units Request message to the OCS 2, for example over Ro interface. In step 13 the OCS 2 performs the appropriate credit processing based on the received request. In step 14 the OCS 2 responds with a Debit Units Response message to the SMS node 1. In step 15, if authorised, the SMS node 1 continues the SM processing as appropriate for the origination procedures.

Figure 1A:
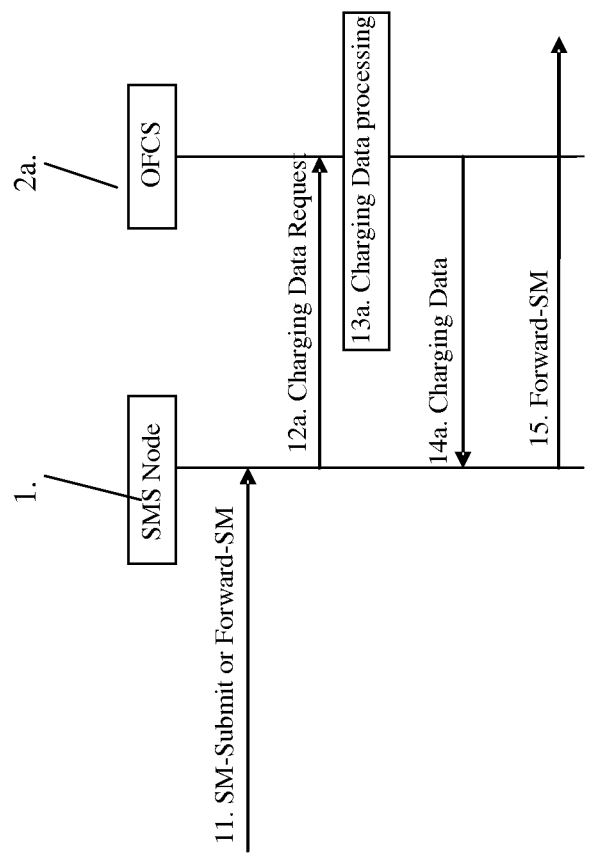

FIG. 1*a* shows the SMS mechanism in operation with an offline charging system (OFCS). In contrast with FIG. 1, here in step 12*a* the SMS node 1 can trigger with a charging data request message the OFCS 2*a*, for example over Rf interface. In step 13*a* the OFCS 2*a* can perform the appropriate charging data collection based on the received request. In step 14*a*, the OFCS 2*a* can respond with a charging data response message to the SMS node 1. For FIG. 1 and 1*a* the forwarding of the short message (step 15) can also happen before receiving a response from the OCS 2 or ODCS 2*a* (step 14 or 14*a*).

Figure 2:
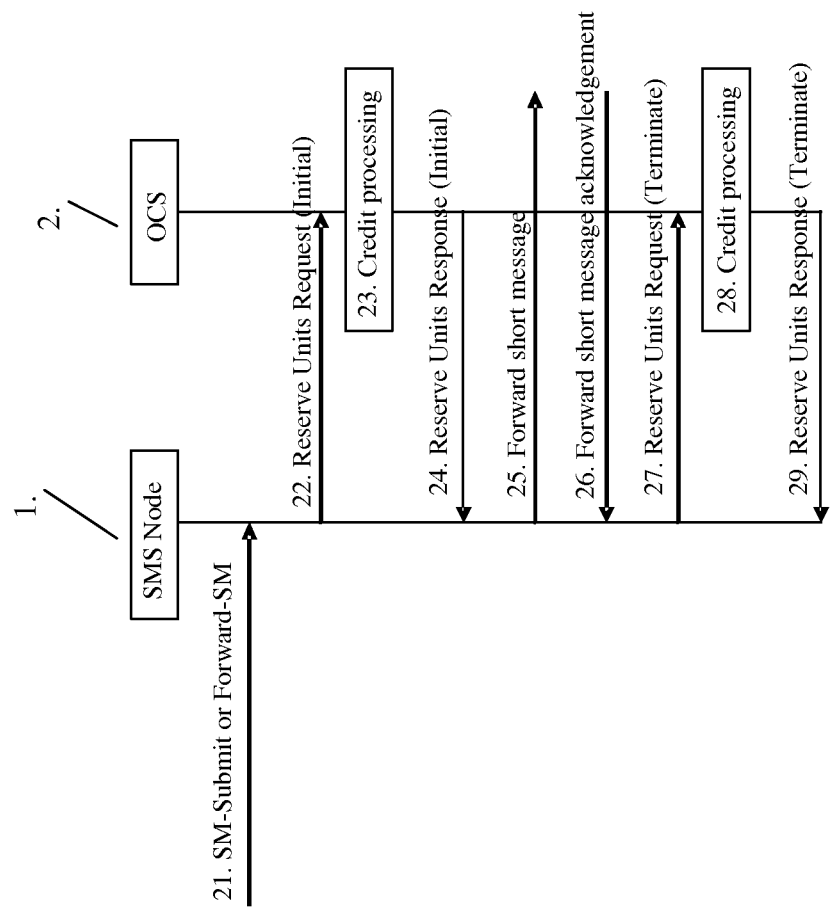

FIG. 2 shows an example of Event Charging with Unit Reservation (ECUR). In step 21, depending on which SMS mechanism (i.e. SMS or SMSIP) is in operation, the SMS node 1 receives an incoming SM-Submit or a MAP-Forward-SM. In step 22, the SMS node 1 triggers a Reserve Units Request (Initial) message to the OCS 2 and in step 23 the OCS 2 performs the appropriate credit processing based on the received request. In step 24 the OCS 2 responds with a Reserve Units Response message to the SMS node 1. In step 25, if authorised, the SMS node 1 continues the SM processing as appropriate for the origination procedures. In step 26 the SM transaction is successfully acknowledged and in step 27 the SMS node 1 triggers a Reserve Units Request (Terminate) message to the OCS 2 reporting the successful event transaction. Finally in step 28 the OCS 2 performs the appropriate credit processing based on the received request and in step 29 the OCS 2 responds with a Reserve Units Response message to the SMS node 1.

Diameter messages can include attribute-value pairs (AVP). An AVP is a generic pair of values that consists of an attribute header and the corresponding value. The attribute-value pair is used to encapsulate protocol-specific data such as routing information, as well as authentication, authorisation, or accounting information. An AVP can include further AVPs in it.

For short messages, "SMS-Information" AVP is defined. The AVP allows the transmission of additional SMS service specific information elements. "SMS-Information" AVP can be transmitted from a charging trigger function (CTF), such as SMS Node, to a charging data function (CDF) for offline charging, such as billing system, and to an online charging function (OCF) for online charging. The "SMS-information" AVP has the following structure:

SMS-Information::=<AVP Header:2000>
    [SMS-Node]
    [Client-Address]
    [Originator-SCCP-Address]
    [Recipient-SCCP-Address]
    [SMSC-Address]
    [Data-Coding-Scheme]
    [Destination-Interface]
    [SM-Discharge-Time]
    [SM-Message-Type]
    [Originator-Interface]
    [SM-Protocol-ID]
    [Reply-Path-Requested]
    [SM-Status]
    [SM-User-Data-Header]
    [Number-Of-Messages-Sent]

With regard to multimedia messaging service (MMS), Recipient-Address AVP has been defined which purpose is to identify the recipient of a message.

It has the following structure

Recipient-Address::=<AVP Header:1201>
    [Address-Type]
    [Address-Data]
    [Address-Domain]
    [Addressee-Type]

The "Recipient-Address" AVP for MMS can occur multiple times for one multimedia message (MM). Each "Recipient-Address" defines one recipient (user) where the multimedia message shall be broadcasted to. For SM service, each instance of "Recipient-Address" AVP is defined as a different identification of the same party, i.e. mobile subscriber international ISDN number (MSISDN) and international mobile subscriber identity (IMSI). This is needed e.g. for determining the subscriber even if his (mobile) number was ported which may result in applying a different tariff.

At the moment it is assumed that there is only one "real" destination for a SM, and this is also true for Instant Messaging (IM) interworking, since SIP message can contains also only one destination (Request-URI). This R-URI may be a group-list entry but still keeps being one destination and this does not resolve in multiple recipients on the charging interface.

The SMS Ro interface charging data can re-use preliminarily defined MMS parameters (Attribute Value Pairs (AVP) in Diameter terms) as appropriate. As for SM destination, the Recipient-Address AVP can be used which may occur as multiple instances in the SMS information AVP.

But, as for the MMS, it is assumed that each instance of recipient address is a different party whereas for the SMS each instance is defined as a different identification of the same party. The simple re-use of Recipient-Address in SMS environment for different destinations is therefore not possible because of the fixed protocol syntax. There is no formal means to identify whether a Recipient-Address of one type (identification) belongs to the same Recipient-Address of another type (identification), i.e. whether these are different identifications of the same recipient or actually different recipients.

There is also the requirement to use the recipient list (in the meaning of different destinations) as rating input which cannot be realized in a confidential way with the current definition. This means that a price per SM can depend on the total amount of the recipients for a single SM, for example, the price for sending a single SM can be 0.10€, however, if the same SM is sent to multiple recipients the price can be 0.07€ per each recipient or per each additional recipient.

An attempt to solve the problem could be:

Operator specific definition and constraint on the use of recipient-address: Then specific agreed rules may be applied per definition, e.g. there is only one destination and any recipient-address is just a different Id; each recipient-address is considered a different destination; there are different destinations, but necessarily signalled with same type, e.g. MSISDN (E.164)—no associations with other optionally conveyed Ids or something more complex ruling.

Another option is to misuse an existing AVP in the Recipient-Address AVP structure as a kind of recipient identifier (or correlation Id). I.e. a distinct number for each destination, e.g. Recipient-Address (type=MSISDN, ID=1), Recipient-Address (type=IMSI, ID=1), Recipient-Address (type=MSISDN, ID=2). The only available AVP for such unusual use would be the Addressee-Type (enumerated data type with 3 different values for "to", "cc" and "bcc").

Both above solutions do not provide full flexibility.

According to an embodiment of the invention a new grouped AVP is provided which can carry one or more [Recipient Address] AVPs.

*[Recipient]//new grouped AVP, multiple occurrence
*[Recipient-Address]//MMS AVP as existing, multiple occurrence
[Address-Type]//Sub AVP as existing
. . .

The new AVP can be embedded into the [SMS-Information] AVP as following:

SMS-Information::=<AVP Header:2000>
[SMS-Node]
[Client-Address]
[Originator-SCCP-Address]
[Recipient-SCCP-Address]
[SMSC-Address]
[Data-Coding-Scheme]
[Destination-Interface]
[SM-Discharge-Time]
[SM-Message-Type]
[Originator-Interface]
[SM-Protocol-ID]
[Reply-Path-Requested]
[SM-Status]
[SM-User-Data-Header]
[Number-Of-Messages-Sent]
*[Recipient]

According to this aspect of the invention the SMS Charging with the new AVP parameters, which is here called [Recipient], can allow handling an unlimited number for the different receiver destinations. The function of new AVP ([Recipient]) is to carry one or more "[Recipient-Address] AVPs defined for the MMS. Backward compatibility can be reached by placing the new structure in SMS-information only while keeping the MMS re-use as is with the condition that just one option must be used.

In the following examples it is described how SM recipient identities, which are stored in [Recipient Address] AVP, can be embedded in Diameter. In first example, all [Recipient Address] AVPs are embedded in a single [Recipient] AVP, which in turn can be embedded in [SMS Information] AVP, for example, in the Diameter Credit Control Request (CCR):

[CCR Request]
  [SMS Information]
    [Recipient]
      [Recipient Address]
      [Recipient Address]
      [Recipient Address]

In a second example, each [Recipient Address] AVP is embedded in a separate [Recipient] AVP, and those AVPs in turn can then be embedded in [SMS Information] AVP, for example, in the Diameter CCR:

[CCR Request]
  [SMS Information]
    [Recipient]
      [Recipient Address]
    [Recipient]
      [Recipient Address]
    [Recipient]
      [Recipient Address]

Also other alternatives are possible, for example, embedding more than one but not all [Recipient Address] AVPs in one [Recipient] AVP.

The components in the [SMS Information] that can be used for SMS charging can be found in a table of 3GPP specification TS 32.274. The new AVP is shown in Italic font:

TABLE

| | SMS Information used for SMS Charging | |
|---|---|---|
| Field | Category | Description |
| SMS Node | $O_M$ | Identifies the SMS Node as IP-SM-GW or SMS Router or a combined IP-SM-GW/SMS Router. |
| SM Client Address | $O_M$ | This field holds the address of the SMS node to which the charging system is connected to. This may be the same as the SMSC Address field. |
| Originator SCCP Address | $O_C$ | This field holds the SCCP calling address used to receive the SM at the SMS node. Only present if SMSIP is not used for the inward connection. |
| Recipient SCCP Address | $O_C$ | This field holds the SCCP called address used by the SMS node to onward deliver the SM. Only present if SMSIP is not used for the outward connection. |
| *Recipient* | $O_C$ | *This field holds the list of the recipient address of the SM. Each recipient address will typically be an E.164 number or a shortcode. Multiple addresses may be carried if additional information is available, e.g. IMSI and E.164 number.* |
| . . . | . . . | . . . |

Into 3GPP specification TS 32.299, following definition can be introduced:

Recipient AVP

The Recipient AVP (AVP code 20xx) is of type Grouped and contains the list of Recipient addresses of the message.

It has the following ABNF grammar:

Recipient::=<AVP
Header:20xx>
*[Recipient-Address]

Figure 3:
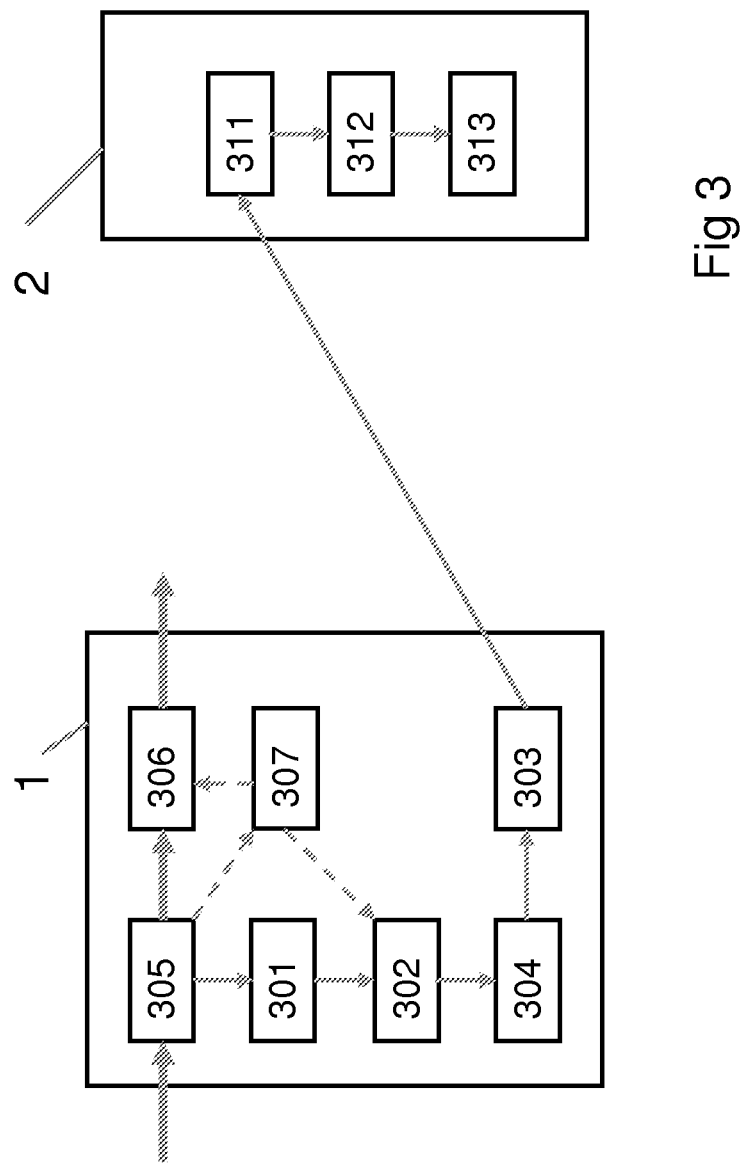
FIG. 3 illustrate internal structure and functions of an SMS node and charging node implementing aspects of the invention.

FIG. 3 shows an example functions and structure of an SMS node implementing aspects of the invention. An SMS node 1 can comprise a detecting unit 301 than can detect request(s) to deliver more than one SMs from a single user/sender 3. The SMS node 1 can include a combining unit 302 configured to combine information related to recipients of the plurality of short messages in a (single) signalling message. The information related to the recipients may indicate identities of the recipients, such as MSISDN, E.164 number or IMSI. The combining unit 302 can be configured to include the identities of the recipients in an attribute-value pair (AVP), for example, in a [Recipient-Address] AVP, and this can be done so that the recipient identity of each short message is placed in a separate AVP which results in having the AVP embedded in the signalling message once per a short message to be delivered to recipients. The SMS node can comprise an embedding unit 304 to embed the AVP including the identities of the recipients into at least one further next level AVP for indicating a recipient. This new AVP can be called for example [Recipient] and can be repeated multiple times in the single message or AVP. The embedding unit 304 can be configured to embed the further AVPs for indicating the recipient into a [SMS Information] AVP, and the [SMS Information] can be included in a Diameter CCR signalling message to be sent to an OCS 2 as well as in a Diameter ACR signaling messages to be sent to an OFCS 2a.

A transmitting unit 303 can transmit the signaling message, which is partly constructed by the combining unit 302 and the embedding unit 304, to a charging function 2, for example, to an online charging system (OCS) 2 or offline charging system (OFCS) 2a. The transmitting unit 303 can transmit the signaling message over Diameter protocol based interface and can transmit over Ro interface defined by the 3GPP.

The SMS node 1 can include a receiving unit 305 to receive request(s) to deliver more than one SMs. The receiving unit 305 can receive requests, for example, according to mobile application part (MAP), short message peer-to-peer (SMPP) protocol, session initiation protocol (SIP), short message over SIP (SMSIP) or other IP based protocols. The detecting unit 301 can be configured to detect in the received request that delivery of short message(s) is requested.

The SMS node 1 can implement the function of a short message service router (SMS Router), an internet protocol—short message service gateway (IP-SM-GW), and/or short message service center (SMSC).

The SMS node 1 can comprise a relaying unit 306 configured to relay, forward or transmit the short messages further in a SMS system 40. The relaying unit 306 can relay the request(s) to deliver according to the same protocol than the request(s) was received by the receiving unit 305, or, can relay the request(s) to deliver SMs after converting the request(s) into another protocol for carrying the SMs. Example protocols are MAP, SIP, SMSIP and SMPP.

The SMS node 1 can comprise an awaiting unit 307, adapted to wait a predetermined time, after receiving a request to deliver an SM(s), to check whether a further request to deliver an SM and which originates from the same single user 3 is received. The awaiting unit 307 can comprise a timer and the timer can be re-started after each received SM request from the same user to monitor whether still further SM request(s) are received relating to the same sender. If further request(s) is received when the timer is running, the combining unit 302 can be configured to combine the information related to recipients into the signaling message. The actual SM delivery by the relaying unit 306 can continue immediately despite collecting requests for charging, or alternatively, also the SM delivery by the relaying unit 306 can be delayed until the charging related tasks are completed, for example, a credit check can be performed by a transmitting unit 303 for a prepaid user.

FIG. 3 also presents functions and structure of a charging entity 2, such as OCS 2 or OFCS 2a, implementing aspects of the invention. The charging entity 2 comprise a receiving unit 311 adapted to receive a charging request, for example, a debit/reserve units request such as Diameter CCR, or a charging data request, such as Diameter ACR, relating to delivering plurality of short messages originating from a single user 3. The charging entity 2 can comprise an extracting unit 312 configured to extract, in the received request, identities (e.g. MSISDN, IMSI) of recipients of each short message delivery. Each identity can be embedded in a separate [Recipient-Address] AVP. The extracting unit 312 can extract the AVP including the identities of the recipients from at least one further AVP for indicating a recipient, which in turn, can be extracted from a [SMS Information] attribute-value pair (AVP). Further on the charging entity 2 can comprise a pricing unit 313, receiving the extracted information from the extracting unit 312, and calculating the price per short message, or the total price for delivering all the short messages, by taking the number of short messages delivered from the user/sender into account.

All units described above may be implemented for example using microprocessors and/or other electrical components and/or by software.

A charging function and an SMS entity may be physically implemented in a switch, router, server or other hardware platform or electronic equipment which can support data transmission and processing tasks, or can be implemented as a component of other existing device.

Figure 4:
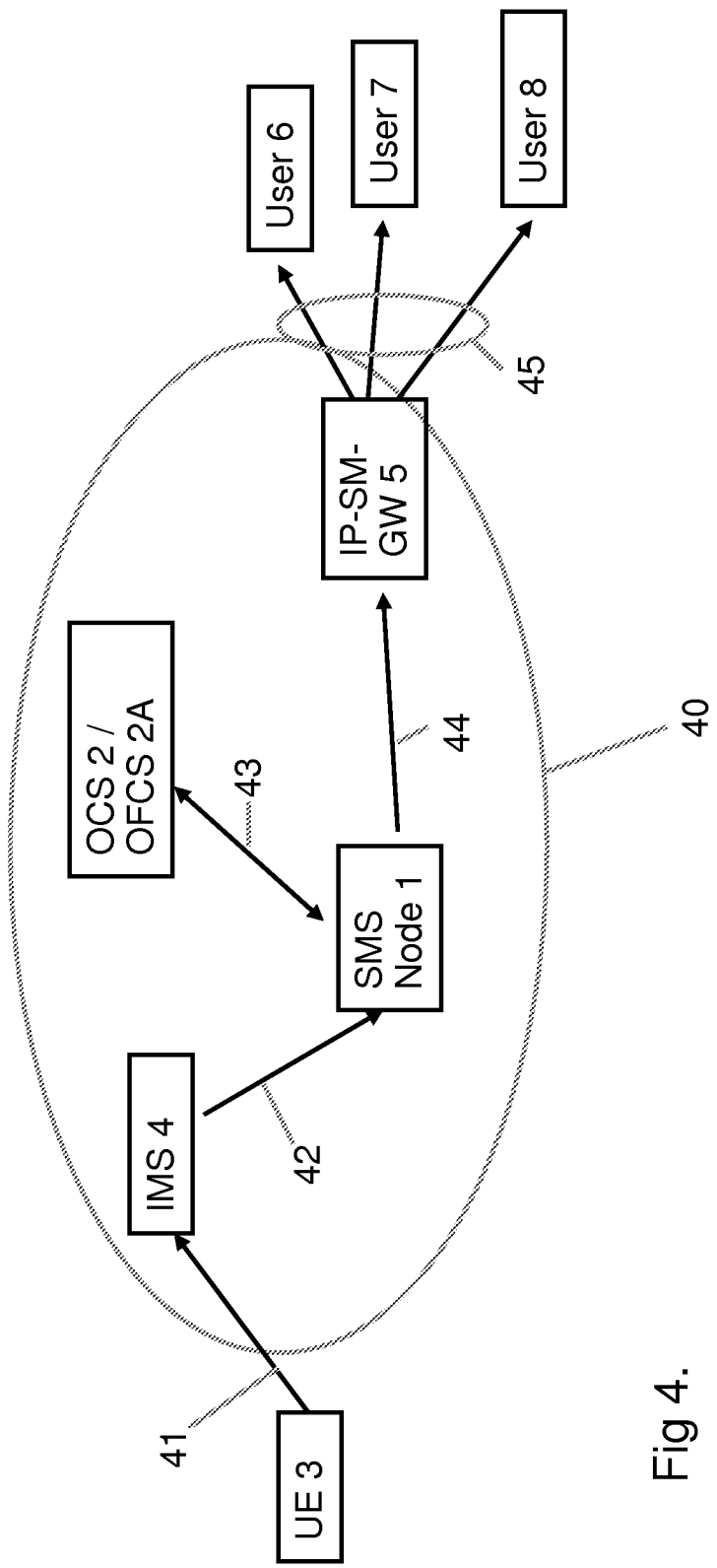
FIG. 4 illustrate example network architecture relevant for the invention.

Next, some aspects of the invention are explained with help of FIG. 4 which shows example network architecture and transmittal of a multi-recipient SM in the network 40. UE 3 can be a subscriber to an IP based network, such as a SIP client that is subscribing to the IMS 4 services. The UE 3 may send a SIP immediate message to multiple recipients (users 6, 7, 8). As illustrated with line 41, the UE 3 can send the message to the IMS 4 using SIP MESSAGE. The content of the SIP MESSAGE is to be treated as a (GMS) SM. The IMS 4 can transmit the SIP MESSAGE carrying the SM to multiple recipients further in the network 40, as shown with line 42, for example to an SMS node 1 implementing aspects of the invention. The transmission between the IMS 4 and the SMS node 1 (line 42) can happen through another protocol (e.g. SMPP, SMSIP) than the transmission between the UE 3 and the IMS 4. However, still the multiple SMs to be delivered to users 6, 7 and 8 can be carried in a single IP based message in the SM network 40. Also the SMS node 1 can send a charging request relating to all these SM deliveries in a single charging request to a charging system OCS 2 or OFCS 2a. The SMS node 1 can still transmit the SMs towards recipients 6, 7, 8 in a single message as shown with line 44. Again the protocol used for carrying the SMs in interface 44 can be different than the protocol(s) used in interfaces 41 and 42. The SMS node 1 can transmit the request to deliver SMs for example to an IP-SM-GW 5 which finally converts the SM request into multiple SMs that are transmitted one-by-one to users 6, 7 and 8 as shown with line 45, for example, using MAP. The SMS node 1 can also convert the SM request to multiple SMs that are transmitted one-by-one to users 6, 7 and 8 (not shown in FIG. 4).

FIG. 5 shows an example process according to an embodiment of the invention. The process can be performed for example by an SMS node. In step 51, one or more request are received for delivering SMs. Either one request to deliver an SM to multiple recipients can be received, which, in the end, results in delivering multiple SMs to the recipients, or alternatively several requests, each to deliver a SM to a single recipient can be received, which again together result in delivering multiple SMs to the recipients, or a mixture of both. Line 56 illustrates that after receiving a SM request, it can be waited for a while whether a further SM request is received from the same user. In step 52, it is detected that multiple SM delivery requests concern the same originating user (sender). In step 53, information about each (or at least more than one) SMs originating from the same user is combined into a single charging request. The information can be recipient identity such as MSISDN or IMSI. In step 54, the charging request is sent to a charging system and in step 55 processing the SM request(s) continues towards recipients. Steps 54 and 55 can be performed in a different order.

FIG. 6 shows an example process according to an embodiment of the invention. The process can be performed for example by a charging node (OCS/OFCS). In step 61, a charging request associated with a single originating user (SM sender) is received, for example, from an SMS node. The charging request is including information about more than one SM to be delivered. In step 62, the recipient information (MSISDN, IMSI) of each SM to be delivered is extracted from AVPs of the charging request. In step 63, a price can be defined for delivering the short messages originating from the single sender 3 taking the number of short messages into account. The price can be defined, for example, per each short message or a total price can be calculated for delivering all the short messages.

A recipient and destination in embodiments of the invention can be interpreted to mean the recipient/destination of each individual SM, meaning that if, for example, two SMs are to be delivered to the same single end user (recipient/destination), these are two different recipients from the SMS node and SM delivery point of view. In other words, if two SMs originating form the same single user are to be delivered to the same single user/recipient/destination, the identity of this same single user/recipient/destination is included two times in AVPs of a charging message sent to a corresponding charging system. This can be for example done in order to make it clear to the charging function that two SMs are to be delivered.

In embodiments of the invention, a short message (SM) can be considered as a GSM short message from a user point of view. However, in the network an SM can be carried in other protocols, traditionally in MAP, however, a request to deliver an SM can be carried also in other protocols like for example SIP, SMSIP, SMPP, or UCP. These protocols can support transmitting a request to deliver an SM to multiple recipients, although the traditional GSM SM (with MAP) is always only one-to-one SM. These other protocols can be considered to be used to request delivery of a (GSM) SM. Requests to deliver SMs can be received by the SMS node for example from UE, an SMSC, an IP-SM GW, an MSC, an SMS-Router, etc.

In aspects of the invention, an SMS node is not receiving (GSM) SMs, but may receive for example a SIP MESSAGE. The SMS node then realizes that the SIP MESSAGE contains a request to deliver SMs and that the SIP MESSAGE is to be converted to multiple GSM SMs for delivery. The conversion can take place at the SMS node, or elsewhere in the network later, however, even if the conversion happens elsewhere in the network, the SMS node can detect that such a conversion is needed and hence the request(s) in question is a request(s) to deliver SMs, although coded in SIP for example.

In aspects of the invention, detecting by an SMS node that multiple SMs are to be delivered means that the SMS node can detect a request to deliver GSM SM even though a SIP MESSAGE is received, as the SIP MESSAGE can include a message (SM) to be delivered later as GSM SM. Therefore a SMS report to charging system can be sent.

In aspects of the invention, multiple SM recipients can be embedded in the Diameter application for SMS Online Charging as well as for SMS Offline Charging. In aspects of the invention, the charging request can be, for example, a debit units request, a reserve units request or a charging data request of Diameter protocol, or other type of charging related request.

A further embodiment of the invention is described here. Current standards specifications do not describe any mechanisms to deliver one mobile originated (MO) short message to multiple destinations. Currently, when a mobile user wants to send an SM to multiple destinations, the UE generates multiple MO messages, one for each destination (recipient).

Multi-destination SMS may be provided by implementing a separate application connecting to an SMSC, which manages so-called delivery lists per subscriber. After sending one MO SM to this delivery-list-application, the delivery-list-application can look from its local database (or similar) to whom to send the SM. Management of all the provisioning data relating to delivery lists is not obvious for most end-users.

In an embodiment of the invention an extension to the Short Message Service (SMS) in GSM networks is introduced, allowing an UE to submit an SM to multiple destinations (recipients) without sending the user data contents multiple times over the air interface and without managing delivery lists in the network. In this embodiment of the invention, a new user-data-header (UDH) information-element is used. The information element can be coded in the user-data-header to transfer any additional destinations to the SMSC. The SMSC can unpack the additional destinations and deliver the SM to each of these destinations. The SMSC can also strip away the header elements carrying the additional destinations, and/or can re-concatenate the short-messages as needed.

The phone client can have notion of delivery lists, but the UE may still submit multiple MO SMs, one for each destination. In one aspect of the invention, the client can switch to a smarter multi-destination handling. In this case, all additional destination addresses can be encoded in a new information element, such as new Information-Element-Id (IEI), and embedded in the user-data-header. The rest of the user-data can be filled according to normal SM handling, and the message can be concatenated if the total length exceeds the maximum length defined for a single SM. When receiving an SM, an SMSC can check for the new Information-Element-ID. If additional destinations are found in the information element embedded in the user-dada, the SMSC can create duplicate mobile terminating (MT) messages, one for each destination. All MT messages can be stripped from the additional destination addresses, and may be re-assembled and re-fragmented as needed, as the user data length is reduced by deletion of all the extra IEI containing the additional destinations.

The SMSC can perform specific logic related to charging, for example, creating a submit-log for each destination, and/or setting special tariffs, possibly according to the number of destination addresses used. This can be used to support the business logic of the operator related to multiple-destination submissions.

Lack of optimised delivery-list functionality has kept distribution of news or other distribution limited to service providers, or minor usage. By implementing this embodiment of the invention to the SMS, operators can promote the usage of SMS as a bearer for one-to-many messaging. Users can manage their delivery lists themselves and no provisioning is needed at the SMSC by the operator. Providing an update to the SMS-client or integrated messaging client at the UE can make this feature very easy to use for the end-users. Since multi-destination messaging is already known to end users from MMS and email, adding support for the same on SMS may benefit operators to keep traffic on the profitable well-established SMS bearer. Also introduction of an integrated messaging clients can become smoother if all bearers support multiple-destination messaging feature as otherwise the client may have to switch to the MMS even though the message contains only text. For end-users, the feature may result in cheaper and faster delivery of "broadcast" messages to group of people, for example, to football team members, school class members, etc, where the sender wants to submit 10-30 SMs at a time, currently possibly by hand separately depending on the terminal. The feature can be offered cheaper by the service provider since sending one MO message can use less air-interface and SS7 signalling resources, compared to sending multiple MO SMs, one to each destination, separately.

The feature can require changes to both, UE client implementation and in the SMSC. Adoption of the feature by SMSCs can be speeded up by having the one-to-many exploding handled by a separate external application. UE can be configured to use an alternative SMSC address (or protocol identifier (PID)) to force the routing to the SMSC supporting this application.

The user-data-header of an SM can contain different elements. Some of the element can be service center (SC) specific. For implementing aspects of the invention these elements can contain a mobile subscriber international integrated services digital network (ISDN) number (MSISDN). Standardizing the user-data-header Information-Element-ID according to this embodiment of the invention can allow interoperability between SMSCs and handsets supporting that version of the SMS standards.

This embodiment of the invention can be implemented by providing a mobile terminal comprising a messaging client for submitting a short message (SM), the short message is comprising a user data header (UDH), and wherein the messaging client allows a user of the mobile terminal to select at least one additional recipient for the short message (SM), an encoder for encoding at least one address of the at least one additional recipients into the user data header (UDH) of the short message (SM). The selecting of the at least one additional recipient by the user can comprise selecting a delivery list. A sender for sending the short message (SM) can be introduced.

Further the embodiment of the invention can also be implemented by providing a messaging client for submitting a short message (SM), the short message is comprising a user data header (UDH), and wherein the messaging client allows a user to select at least one additional recipient for the short message (SM), and wherein the messaging client comprises an encoder for encoding at least one address of the at least one additional recipients into the user data header (UDH) of the short message (SM). The selecting of the at least one additional recipient by the user can comprise selecting a delivery list.

Further the embodiment of the invention can also be implemented by providing a short message service center (SMSC), comprising receiver for receiving a short message (SM), a checker for checking if an information element including additional destinations is found in the user-dada header (UDH), a creator for creating duplicate mobile terminating (MT) messages, one for each destination. Additionally, the SMSC can comprise one or more of following units:
- a stripper for stripping away the additional destination addresses for mobile terminating (MT) messages, and/or
- re-assembler for re-assembling and/or re-fragmenting the user data header, and/or
- tariff unit for setting special tariffs according to the number of destination addresses.

Functions of a charging function and an SMS node described above may be implemented by code means, as software, and loaded into memory of a computer.

The invention claimed is:

1. A short message service entity, comprising:
a receiving unit capable of receiving at least one request from a single mobile station, the at least one request having been originated by an originator being an entity different than the short message service entity;
a detecting unit for detecting the at least one request, wherein said detecting unit is configured for detecting that the at least one request from the single mobile station requests delivery of a plurality of short messages originating from the single mobile station to a plurality of recipients;
a combining unit connected to said detecting unit for combining information related to the plurality of recipients of the plurality of short messages in a signaling message such that the signaling message contains a plurality of recipient addresses, each of the addresses corresponding to a respective recipient and is a message different than the at least one request; and
a transmitting unit connected to said combining unit for transmitting the signaling message comprising the plurality of recipient addresses to a charging function, the charging function being an entity different than the short message service entity, wherein the signaling message is used to apply charging to the originator of the at least one request.

2. The short message service entity according to claim 1, wherein the information related to the recipients comprises identities of the recipients of the plurality of short messages, and wherein said combining unit is configured to include the identities of the recipients of the plurality of short messages in attribute-value pairs.

3. The short message service entity according to claim 2, wherein including the identities of the recipients comprises including an identity of a recipient of each short message in a separate attribute-value pair so as to have the attribute-value pair embedded in the signaling message once per a short message to be delivered to recipients.

4. The short message service entity according to claim 2, wherein the attribute-value pair comprises [Recipient-Address] attribute-value pair.

5. The short message service entity according to claim 3, which further comprises an embedding unit for embedding the attribute-value pairs including the identities of the recipients into at least one further attribute-value pair for indicating a recipient, said embedding unit being configured to carry out at least one step selected from the group consisting of:
embedding each attribute-value pair including the identity of the recipient in a separate further attribute-value pair for indicating the recipient; and
embedding all the attribute-value pairs including the identities of the recipients into the single further attribute-value pair for indicating the recipient.

6. The short message service entity according to claim 5, wherein said embedding unit is configured to embed the at least one further attribute-value pair for indicating the recipient into an [SMS Information] attribute-value pair.

7. The short message service entity according to claim 1, which further comprises at least one of a short message service router, an internet protocol—short message service gateway, and a short message service center.

8. The short message service entity according to claim 7, further comprising a unit for awaiting, after receiving a first request of the at least one request, a predetermined time to check whether a further request to deliver a short message originating from the single mobile station is received, and wherein, if the further request is received, the combining unit is configured to combine the information related to recipients into the signaling message.

9. A method of short message charging, the method comprising:
a short message service entity receiving at least one request from a single mobile station, the at least one request having been originated by an originator being an entity different than the short message service entity;
detecting that the at least one request from the single mobile station is to deliver a plurality of short messages originating from the single mobile station to a plurality of recipients;
combining information related to the plurality of recipients of the plurality of short messages in a signaling message such that the signaling message contains a plurality of recipient addresses, each of the addresses corresponding to a respective recipient and is a message different than the at least one request; and
transmitting the signaling message comprising the plurality of recipient addresses to a charging function, the charging function being an entity different than the short message service entity;
wherein the signaling message is used to apply charging to the originator of the at least one request.

10. The method according to claim 9, wherein the information related to the recipients comprises identities of the recipients of the plurality of short messages, and the combining step comprises including the identities of the recipients of the plurality of short messages in attribute-value pairs.

11. The method according to claim 10, wherein the step of including the identities of the recipients comprises including the identity of the recipient of each short message in a separate attribute-value pair so as to have the attribute-value pair embedded in the signaling message once per short message to be delivered to recipients.

12. The method according to claim 11, wherein the attribute-value pair comprises a [Recipient-Address] attribute-value pair.

13. The method according to claim 11, which further comprises:
embedding the attribute-value pairs including the identities of the recipients into at least one further attribute-value pair for indicating a recipient, the embedding step comprising at least one step selected from the group consisting of:
embedding each attribute-value pair including the identity of the recipient in a separate further attribute-value pair for indicating the recipient; and
embedding all the attribute-value pairs including the identities of the recipients into the single further attribute-value pair for indicating the recipient.

14. The method according to claim 13, wherein the embedding step comprises embedding the at least one further attribute-value pair for indicating the recipient into a [SMS Information] attribute-value pair.

15. The method according to claim 9, further comprising awaiting, after receiving a first request of the at least one request, a predetermined time to check whether a further request to deliver a short message originating from the single mobile station is received, and, if the further request is received, carrying out the combining step by combining the information related to recipients into the signaling message.

16. A non-transitory computer readable medium, comprising computer code means configured to carry out the steps of claim 9 when loaded into the memory of a computer.

17. A communication system, comprising:
the short message service entity according to claim 1; and
a charging entity being an entity different than the short message service entity having a unit configured for receiving a charging request relating to delivering the plurality of short messages to the plurality of recipients, wherein the plurality of short messages originate from a single mobile station.

* * * * *